(No Model.)
J. M. PRIOR.
HOSE COUPLING.
No. 517,192. Patented Mar. 27, 1894.
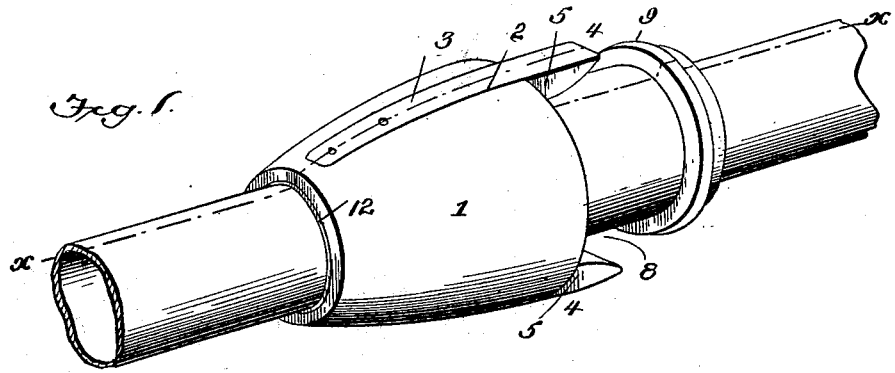
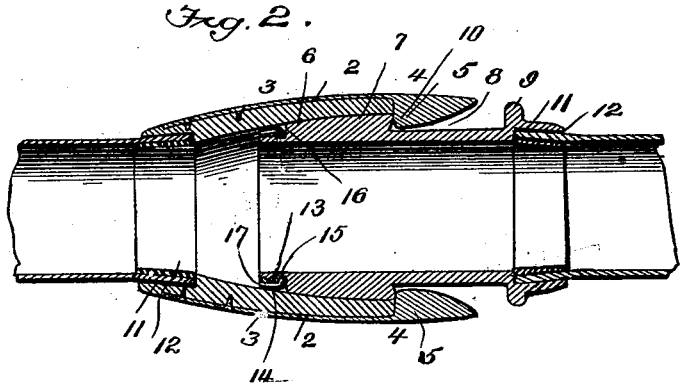
Witnesses
Inventor
John M. Prior.
By John Wedderburn
His Attorney

UNITED STATES PATENT OFFICE.

JOHN M. PRIOR, OF CARSON CITY, NEVADA.

HOSE-COUPLING.

SPECIFICATION forming part of Letters Patent No. 517,192, dated March 27, 1894.

Application filed September 14, 1893. Serial No. 485,457. (No model.)

*To all whom it may concern:*

Be it known that I, JOHN M. PRIOR, a citizen of the United States, residing at Carson City, in the county of Ormsby and State of Nevada, have invented certain new and useful Improvements in Hose-Couplings; and I do hereby declare the following to be a full, clear, and exact description of the invention, such as will enable others skilled in the art to which it appertains to make and use the same.

This invention relates to hose couplings, and has for its object to increase the efficiency and expediency of coupling and uncoupling hose, and provide a water-tight joint, where the hose sections are connected to the parts.

With these and other objects in view, the invention consists of the construction and arrangement of the several parts which will be more fully hereinafter described and claimed.

In the drawings, Figure 1 is a perspective view of a hose coupling embodying the invention, and shown as having sections of hose attached to the parts thereof. Fig. 2 is a central longitudinal section on the line $x$—$x$, Fig. 1.

Similar numerals of reference are employed to indicate corresponding parts in both the figures.

Referring to the drawings, the numeral 1 designates the female head of the coupling, having exteriorly arranged diametrically opposed grooves 2 therein, which receive the shanks 3 of spring-locking jaws 4, provided with inwardly extending engaging noses 5. The noses project beyond one end of the head 1, and by the formation of the grooves 2, the shanks 3 are caused to fit flush with the surface of the said head, and provide a smooth exterior for the latter. The said head 1 is of substantially frusto-conical form, and accordingly wider diametrically at one end than at the other. The wider end of the said head forms an entrance mouth to receive the tapered end 6 of a male head 7, the latter being formed with a circumferential widened groove 8 having a guard-collar 9, integrally formed adjacent to the rear part thereof. The front wall of the groove 8 is slightly cut away at an oblique angle toward the front, as at 10, and the said tapered end 6 of the male coupling is slipped into the entrance mouth of the female coupling and spreads the spring jaws 4 apart to cause the noses to take over the said front wall of the groove 8 and engage the cut away portion 10 to provide a snug and close fit of the several parts to lock the two heads together. The guard-collar 9 serves to prevent exterior objects from engaging the ends of the jaws 4 which project over the noses, and thereby obviate an accidental disengagement. In separating the two heads the spring jaws are forced apart until they clear the front wall of the groove 8, and permit the withdrawal of the male head. It will of course be understood that openings extend through the two heads, and the conical construction of the engaging parts forms a close fitting, water-tight joint.

The forward end of the female head, and the rear end of the male head on the inner portions thereof are formed with upwardly beveled recesses 11, in which the ends of the hose sections are inserted together with an expanding steel ring or band 12, which is of such shape and construction as to fit the recesses and securely hold the ends of the hose sections in connection with the heads, the expanding pressure of the said steel ring or band forces the portions of the hose against which it bears into beveled recesses 11 in each instance.

In the forward end of the male head, a series of screw-threads 13 are formed, and over the said reduced portion as thus constructed, by the provision of the said threads is mounted a leather packing or washer 14 which is made in one piece and held in permanent securement, the said packing or washer being forced backwardly against a shoulder 16, and downwardly into a slight depression. This causes the front portion of the said packing or washer to stand open after it has been trimmed or formed and as shown in Fig. 3 provides convenient means for establishing a water tight joint when the two heads are connected, as the said washer stands above the adjacent surface of the male head, and fits snugly against the inner surface of the female head. A screw-threaded sleeve 17 is then fitted over the screw threads 13, and is provided with a hole 18, for the insertion of the hook or wrench to tighten or release the same.

The heavier the pressure through the coupling, as set forth, the tighter it forces the leather packing on the male head against the female coupling, to thereby insure an absolutely water-tight joint. To release the parts of the coupling the spring jaws are spread apart by the index finger of each hand, and the thumbs placed against the guard 9, and the male head thereby pushed out from the female head. Of course the parts of the device entire will be made of suitable metal and of different sizes, brass being preferable in their construction, and the readiness with which the parts can be attached or detached renders the same exceptionally convenient.

It will be obviously apparent that many minor changes in the construction and arrangement of the several parts might be made and substituted for those shown and described without in the least departing from the nature or spirit of the invention.

Having thus described the invention, what is claimed as new is—

In a hose coupling, the combination of a female head of frusto conical form provided with a pair of spring jaws having inwardly extending oppositely situated noses, a male head having its free end tapered in frusto conical form and provided with a circumferential groove against which the front walls of the jaws are adapted to bear the said tapered free end of the male head being fitted into the female head and having a cylindrical bore of the size of the diameter of the hose section attached thereto, and one of said heads having a screw threaded end, a packing composed of a continuous piece of material mounted over said screw threaded end and a screw threaded sleeve fitted over said screw threaded end and abutting against the said packing, said packing standing out beyond the adjacent surface and having its front end open and exposed, the said head also having recesses on the interior portions of the ends thereof remote from their engaging ends, which are beveled inwardly and upwardly, hose sections adapted to be attached to said recessed ends, and spring rings or bands placed within the connected ends of the hose sections, to force the same upwardly into the said recess, substantially as described.

In testimony whereof I have signed this specification in the presence of two subscribing witnesses.

JOHN M. PRIOR.

Witnesses:
   JAMES A. RAYCROFT,
   JOHN L. EPSTINE.